(12) United States Patent
Kniveton (10) Patent No.: US 7,505,442 B2
(45) Date of Patent: Mar. 17, 2009

(54) ROUTING TRANSFORMATION, SECURITY, AND AUTHORIZATION FOR DELEGATED PREFIXES

(75) Inventor: Timothy J. Kniveton, San Francisco, CA (US)

(73) Assignee: Nokia Corporation, Espoo (FI)

(*) Notice: Subject to any disclaimer, the term of this patent is extended or adjusted under 35 U.S.C. 154(b) by 257 days.

(21) Appl. No.: 11/099,929

(22) Filed: Apr. 5, 2005

(65) Prior Publication Data
US 2006/0221921 A1 Oct. 5, 2006

(51) Int. Cl.
*H04W 4/00* (2006.01)
(52) U.S. Cl. .................. 370/338; 370/255; 370/349; 370/395.31; 709/242
(58) Field of Classification Search ............... 370/338, 370/238, 242, 254, 255, 256, 310, 328, 349, 370/351, 352, 389, 392, 395.31, 400, 401, 370/407, 408; 379/114.13; 709/242
See application file for complete search history.

(56) References Cited

U.S. PATENT DOCUMENTS

| 7,031,328 | B2* | 4/2006 | Thubert et al. .............. 370/401 |
| 7,039,035 | B2* | 5/2006 | Droms et al. ............... 370/338 |
| 7,149,225 | B2* | 12/2006 | Thubert et al. .............. 370/401 |
| 2003/0117965 | A1 | 6/2003 | Markki et al. ............... 370/254 |
| 2004/0114554 | A1* | 6/2004 | Okajima et al. ............. 370/329 |
| 2004/0196854 | A1* | 10/2004 | Thubert et al. ......... 370/395.31 |
| 2004/0246931 | A1 | 12/2004 | Thubert et al. .............. 370/338 |
| 2005/0058100 | A1* | 3/2005 | Lee et al. .................... 370/331 |
| 2005/0152298 | A1* | 7/2005 | Thubert et al. .............. 370/312 |
| 2006/0120382 | A1* | 6/2006 | Thubert et al. ......... 370/395.52 |

OTHER PUBLICATIONS

Devarapalli et al.: "Network Mobility (NEMO) Basic Support Protocol, RFC3963", The Internet Societ, http://ietfreport.isoc.org/rfc/PDF/rfc3963.pdf, part 6.1.2, abstract, pp. 1-33, Jan. 2005.
R. Droms: "DHCPv6 Prefix Delgation for NEMO", Internet Draft: draft-drom-nemo-dhcpv6-pd-00, chapter 3, abstract, pp. 1-6, Jun. 23, 2003.

* cited by examiner

*Primary Examiner*—Matthew D Anderson
*Assistant Examiner*—Shaima Q Aminzay
(74) *Attorney, Agent, or Firm*—Banner & Witcoff, Ltd.

(57) ABSTRACT

A system is provided for prefix delegation with a pre-configured home agent, having a home address, and having a set of mobile router prefixes that are available to delegate to mobile routers. The transceiver of the home agent receives a prefix request option from a mobile router to request a prefix. The home agent assigns a prefix by combining a selected one of the set of mobile router prefixes with at least a part of the home address of the home agent, and sends the assigned prefix to the mobile router. Alternatively, the home agent assigns a prefix by combining a selected one of the set of mobile router prefixes with at least a part of the home address of the mobile router, and sends the assigned prefix to the mobile router.

33 Claims, 8 Drawing Sheets

Prefix Request Option

| 0 | 8 | 16 | 24 | 31 |
|---|---|---|---|---|
| Type | Length | Prefix Type | Prefix Length | |
| Prefix | | | | |

Prefix Designation Option

| 0 | 8 | 16 | 24 | 31 |
|---|---|---|---|---|
| Type | Length | Prefix Type | Prefix Length | |
| Valid Lifetime | | Preferred Lifetime | | |
| Prefix | | | | |

ROUTING TRANSFORMATION, SECURITY, AND AUTHORIZATION FOR DELEGATED PREFIXES

FIELD OF THE INVENTION

The invention relates to mobile networking and communications. Specifically, the invention relates to assigning prefixes to mobile routers.

BACKGROUND OF THE RELATED ART

The Mobile IP Working Group of the Internet Engineering Task Force (IETF) has developed routing support to permit IP nodes (hosts and routers) using either IPv4 or IPv6 to seamlessly "roam" among IP sub-networks and media types. The mobile IP method supports transparency above the IP layer, including the maintenance of active Transmission Control Protocol (TCP) connections and User Datagram Protocol (UDP) port bindings.

The Mobile IP Working Group is attempting to address deployment issues in Mobile IP and provide appropriate protocol solutions to address known deficiencies and shortcomings. For example, the wireless/cellular industry is considering using Mobile IP as one technique for IP mobility for wireless data. The Working Group is developing standards to deploy Mobile IP protocols in the wireless data context.

Internet Protocol Version 6 (IPv6) is the next generation IP protocol. Started in 1991, the specification was completed in 1997 by the IETF. IPv6 is backward compatible with, and is designed to fix the shortcomings of, its predecessor IPv4. Two notable shortcomings fixed by IPv6 relate to data security and the maximum number of user addresses. IPv6 increases the address space from 32 to 128 bits, providing for an unlimited (for all intents and purposes) number of networks and systems. It also supports quality of service (QoS) parameters for realtime audio and video. Originally called "IP Next Generation" (IPng), IPv6 is expected to slowly replace IPv4, with the two existing side by side for many years.

As originally specified, Mobile IP for IPv6 (Mobile IPv6) was presumed to work for mobile nodes that were themselves also routers. Thus, the mobile router would be the point of attachment to the Internet for a collection of subnets, which then could be populated with either fixed or mobile nodes. Passengers on a ship or on a train are examples of mobile nodes that might rely on a mobile router, but clearly many fixed nodes on the ship or train might also have the same reliance. Recent concerns about address ownership have undermined the previous confidence about whether the base protocol specifications are appropriate for mobile routers as well as mobile nodes.

The Network Mobility (NEMO) Working Group of the IETF is concerned with managing the mobility of an entire network, which changes, as a unit, its point of attachment to the Internet, and thus its reachability in the topology. The mobile network includes one or more mobile routers which connect it to the global Internet.

A mobile network is assumed to be a leaf network (it may be complex with many leaf networks embedded in it, so that the Mobile Router would carry traffic to and from those networks), i.e. it will not carry transit traffic. However, it could be multihomed, either with a single mobile router that has multiple attachments to the internet, or by using multiple mobile routers that attach the mobile network to the Internet. The NEMO Working Group's approach assumes that the network's movement needs to be completely transparent to the nodes inside the mobile network. This assumption will be made to accommodate nodes inside the network that are not generally aware of mobility.

A basic approach for network mobility support is for each mobile router to have a Home Agent (HA), and use bidirectional tunneling between the mobile router and HA to preserve session continuity while the mobile router moves. The mobile router will acquire a care-of address from its attachment point similar to what is done for mobile nodes using mobile IP. This approach allows nesting of mobile networks, since each mobile router will appear to its attachment point as a single node.

Figure 1:
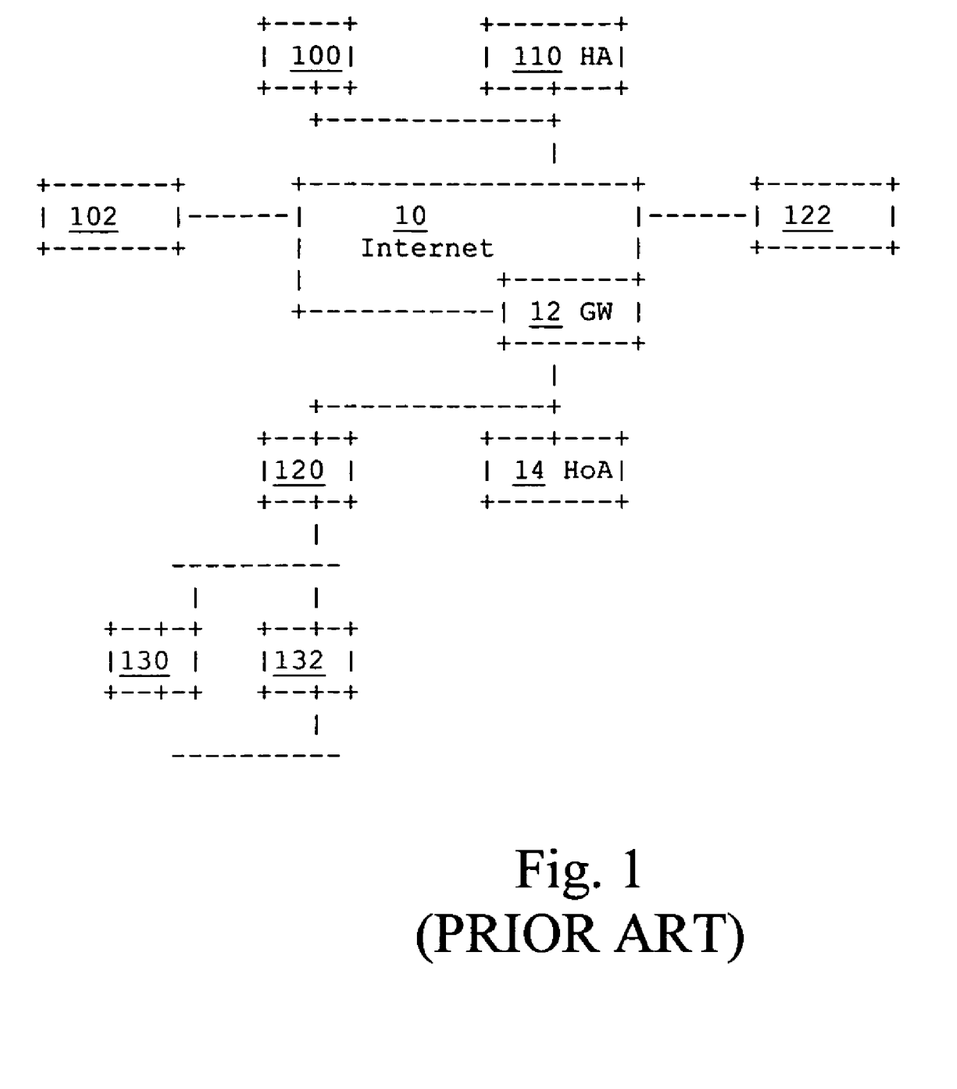
FIG. 1 is a block diagram that illustrates the structure of a prior art network according to the NEMO Working Group of the Internet Engineering Task Force.

With reference to FIG. 1, a block diagram illustrates the structure of a network according to the NEMO Working Group's described system in which a mobile node 100 and a mobile router 120 are in their home wireless network environment connecting to the Internet 10. The mobile node 100 is at home on its home link with its home agent 110. A mobile router 120 is at its home wireless location. The mobile router 120 provides routing for an access link, on which there is a fixed node 130, and an access link for a fixed router 134.

The mobile router 120, a gateway to the Internet 12, and a home agent 14 are routers that forward packets. They each may also use same dynamic routing protocol. There is a correspondent node 102 for the mobile node 100, and a correspondent node 122 for the mobile router.

When a mobile node moves away from its home to link, it signals its home agent 110, and its correspondent node 102 to provide its location and router on which the mobile node 100 is a guest. Bindings are configured on the mobile node's home agent 110 and correspondent node to send and receive data traffic to and from the mobile node 100. Similarly, when mobile router 120 moves away from its home link, it similarly updates its home agent 14, and its correspondent node 122 regarding its new location.

In the NEMO Working Group's system, both mobile node 100 and the mobile router 120 use the NEMO protocol (RFC 3963) along with Mobile IPv6, except that there are further implications to the packet forwarding implementation of the mobile router 120 and home agent 14 for the mobile router 120. Specifically, the mobile router 120 and the home agent 14 for the mobile router use bidirectional tunnel to send and receive data between them. The mobile router 120 installs an encapsulation interface directed towards its home agent 14 when it detects that it is no longer within its home network. Through this interface the mobile router 120 forwards (reverse-tunnels) all packets not originated from the mobile router 120 towards its home agent 14. For packets originated from mobile router, the mobile router functions as if the it is a normal mobile node 100. The packets get forwarded on the visited link, except if the packets are targeted to the home link, then they get reverse-tunneled to home agent. Hence, when arriving at a visited link, the mobile router 120 injects a default route and a network route of its home link, towards the reverse tunnel it creates pointing to its home agent 14, in addition to a default route to the a default router used by the mobile router 120 on the visited link. If the mobile router 120, home agent 14, and gateway at the visited link were running a dynamic routing protocol, the mobile router 120 redirects control traffic of this protocol towards the home agent, tunneling these packets through the reverse tunnel pointing to home agent 14 for the mobile router 120. The dynamic routing protocol updates the routing state between the gateway at the visited location, the home agent 14 for the router, and the mobile router 120.

According to the NEMO Working Group system, if it is not desired that the mobile router 120 runs a dynamic routing protocol, the home agent 14 keeps persistent information regarding the mobile router and its mobile network prefix(es), and injects routing entries into its table based on Binding Updates from the mobile router 120.

There are some solutions being developed in conjunction with the NEMO Working Group that suggest assigning a prefix to a mobile router. An IETF draft for NEMO protocol, draft-droms-nemo-dhcpv6-pd-01.txt, "DHCPv6 Prefix Delegation for NEMO, by Ralph Droms and Pascal Thubert (Droms-Thubert) of Cisco describes the messaging format and protocol operations for transmitting one or more prefixes from a DHCPv6 server (or a home agent acting as a DHCPv6 Relay) to a Mobile Router. The approach described in Droms-Thubert uses a transformation on the lower 64 bits of a mobile network node's address in order to find the home address (HoA) of a mobile router. However, this, and other prior art approaches, have many shortcomings.

For the most part, one or more of the approaches in the prior art only show the protocol operations for "delegating" a prefix from a DHCPv6 server to a Mobile Router. Although some of the draft approaches use the word "delegation," they do not describe a true delegation, in terms of authorization to use a prefix. DHCP is a Configuration protocol and, in general relies, on the concept of "return routability"—meaning that if a mobile node can receive packets on a link to which it is connected, it is more-or-less authorized to use an address on that link.

However, for an entire prefix, the same does not hold true. A router or entity that controls a superset of the prefixes assigned to the mobile router must explicitly allow the mobile router to use those prefixes, since the routing for the prefixes and all nodes contained there within can be manipulated and their traffic can be diverted, so the potential vulnerability to abuse is higher.

Accordingly, authorization must happen at, or at least be transmitted to, the home agent. Since the DHCPv6 server is likely to be a separate box on the network, the home agent has no way of determining whether the mobile router then using the prefix is actually allowed to do so (and hence change the routing characteristics of the prefix).

Finally, while the basic idea of using a prefix is referred to in the IETF NEMO signaling draft, there is insufficient detail regarding how the prefix is used. For example, there are no defined rules for how the home agent and mobile router process the signaling.

BRIEF SUMMARY

According to a preferred embodiment of the invention, the home agent assigns prefixes by the protocol semantics as explicitly defined herein. A mobile router is authorized to use an assigned prefix for the duration of validity of the binding. The home agent, since it keeps track of the prefixes, can deduce when a request is received, and whether the relevant mobile router is the "owner" of the prefix being used.

According to another preferred embodiment of the invention, a system is provided for prefix delegation with a preconfigured home agent, having a home address, and having a set of mobile router prefixes that are available to delegate to mobile routers. The transceiver of the home agent receives a prefix request option from a mobile router to request a prefix. The home agent assigns a prefix by combining a selected one of the set of mobile router prefixes with the home address of the home agent, and sends the assigned prefix to the mobile router.

In yet another preferred embodiment, the home agent assigns a prefix by combining a selected one of the set of mobile router prefixes with the home address of the mobile router, and sends the assigned prefix to the mobile router.

DETAILED DESCRIPTION

This invention relates to mobile routers, or other nodes using the IPv6 Internet protocol for communication. In that respect, a particular embodiment described herein is for mobile routers using the network mobility (NEMO) IETF protocol. However, those skilled in the art can understand that the invention can also be used by non-mobile routers that need entire prefixes delegated to them, so that other nodes they serve can obtain addresses from that pool.

1. Prefix Delegation

One embodiment uses prefix delegation. In this embodiment, the home agent is configured as described in the mobile IPv6 protocol, and also has functionality as described in NEMO IETF protocol, so that it can serve mobile routers and conform to the relevant signaling specifications. Thus, the home agent is be pre-configured with a set of IPv6 prefixes $P\{1\}$-$P\{n\}$, that are available to delegate to mobile routers. Delegation can be accomplished by, for example, manual configuration, routing protocol prefix assignment, or DHCPv6 prefix delegation, as defined in Droms-Thubert. The prefixes can be of any length. However, according to RFC 2373, which defines IPv6 addressing architecture, it is customary for delegated prefixes to be of length 48 bits, (i.e. for a global unicast address, the high-order 48 bits represent (FP| TLA ID |RES| NLA ID) and the next 12 bits, which would be assigned or further delegated by the mobile routers, are the Site-Level Aggregation identifier (SLA ID).

Alternatively, the mobile router may be configured according to IETF Mobile Internet Protocol version 6 (MIPv6) and NEMO protocol. Using MIPv6 protocol, the mobile router and home agent may take advantage of pre-defined security associations used to protect their signaling. One such security association system is described in IETF RFC 3776, "Using IPsec to Protect Mobile IPv6 Signaling Between Mobile Nodes and Home Agents."

Figure 2:
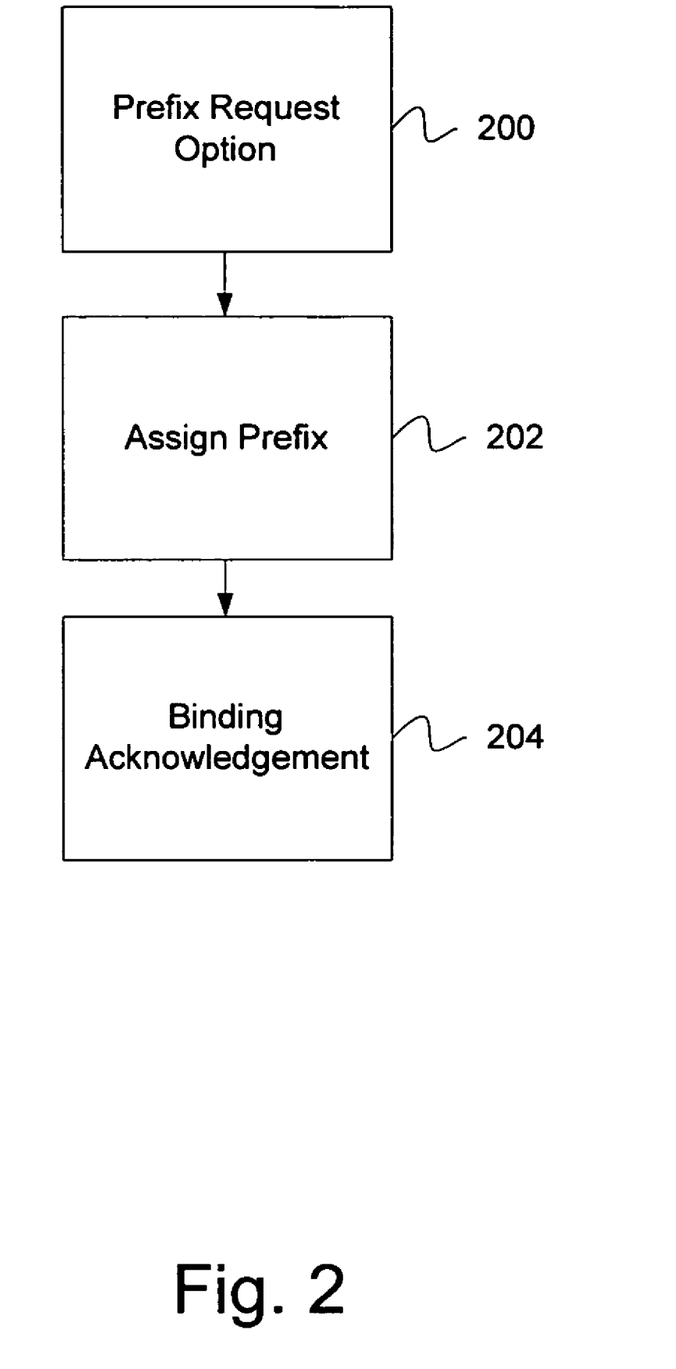
FIG. 2 is a flowchart illustrating the steps performed by a mobile router in one embodiment.

When the mobile router sends a binding update request to the home agent, the R bit is set to indicate that it is a router, as outlined in NEMO protocol. With reference to FIG. 2, a flowchart illustrates the steps performed by a mobile router in one embodiment. The mobile router sends a prefix request option, requesting a prefix, which may be of a selected length and type, and either public or private, step 200. The home agent then assigns it a prefix, step 202, either dynamically from a pool of prefixes, or statically through prior configuration, which will then be owned and usable by the mobile router's mobile network, for at least the length of the mobile router's binding. The home agent will include this information in a binding acknowledgment by providing a prefix delegation option, step 204.

Figure 3:
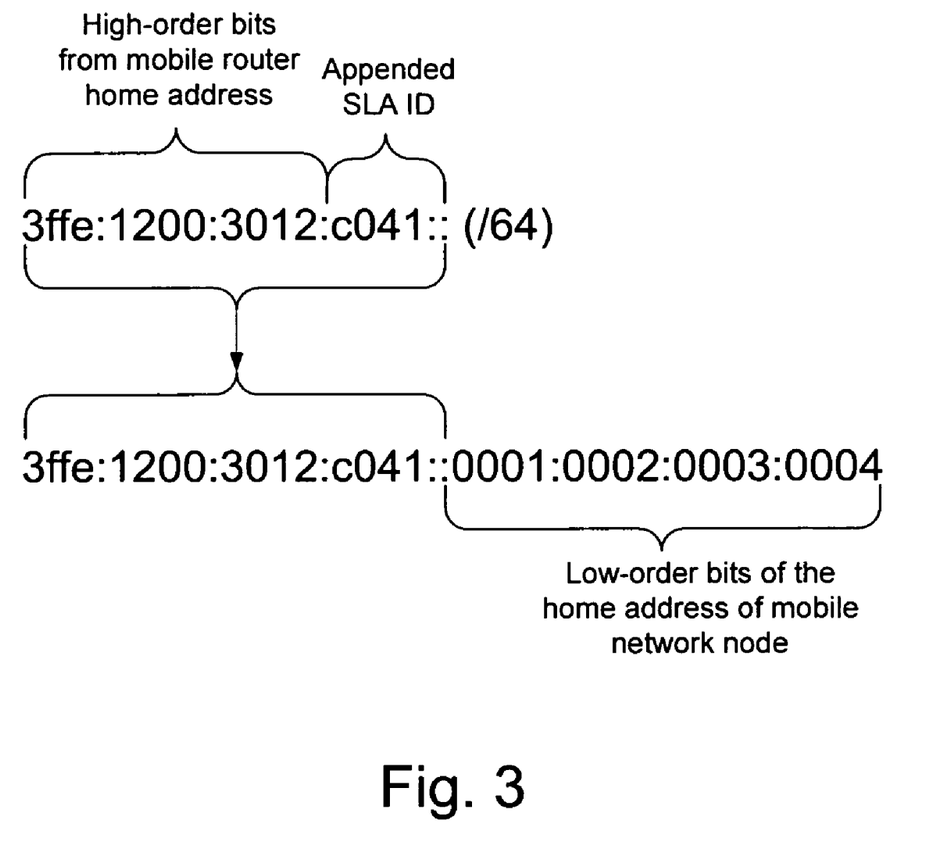
FIG. 3 is a diagram illustrating a mobile network prefix, p, and a mobile network node address derived from it, according to one embodiment.

An example mobile network prefix, p, and a mobile network node address derived from it, is shown in FIG. 3. If, for any reason, one prefix is insufficient, the home agent could also assign multiple prefixes by sending multiple prefix delegation options, and send alternate care of addresses, as defined by MIPv6. The mobile router's home address is address is appended with an SLA ID. The mobile network node's home address of 1:2:3:4: is then appended to configure the assigned prefix.

Figure 4:
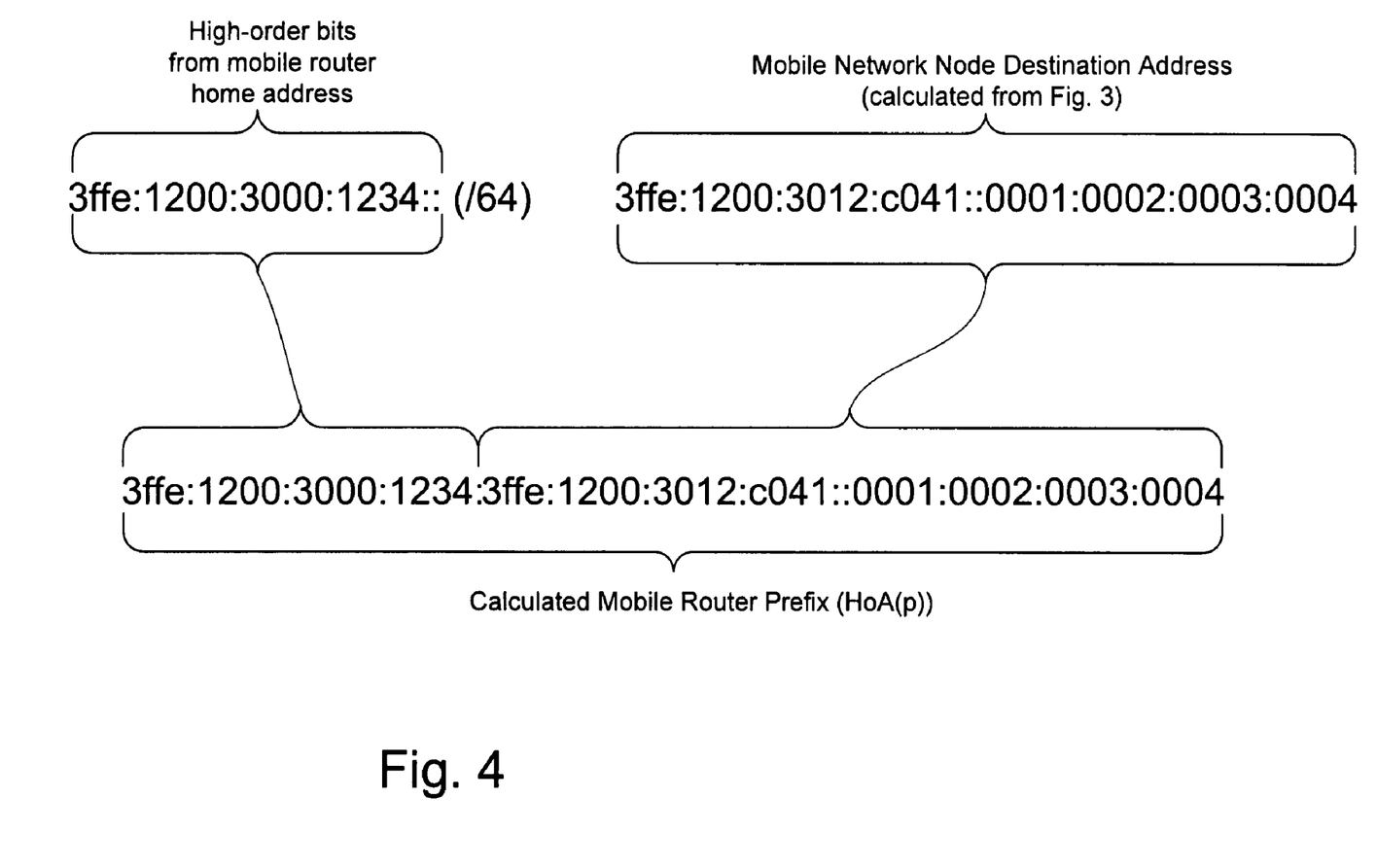
FIG. 4 is a diagram illustrating an assigned mobile router prefix (HoA(p)) constructed from the mobile network node address of FIG. 3.

FIG. 4 is a diagram illustrating an assigned mobile router prefix (HoA(p)) constructed from the high-order bits mobile network node address of FIG. 3. The high-order bits of the mobile router's home address (or prefix) (which has been assigned 3ffe:1200:3000:1234::) is combined with the mobile network node (destination) address (or prefix) to produce a mobile router prefix (HoA(p)).

2. Routing to a Large Number of Mobile Routers without Individual Routing Entries Once the home agent has assigned a prefix (HoA(p)) to the mobile router, there must also be a way to route traffic to the address of the mobile network prefix to the correct mobile router through a bi-directional tunnel. To achieve this, the home agent may have a routing table entry for each mobile network prefix. However, for a large number of mobile routers, and for many prefixes, this could soon produce a large, difficult to manage, routing table.

In one embodiment, this problem is solved by assigning a home address to the mobile router that is mapped from the mobile network prefix. Hence, each time a packet destined for a home network prefix is received, the home address will map it to the HoA(p), without needing a routing table entry.

To accomplish this structure, a prefix that is at least known within an individual provider or site used by mobile routers is used. This is the prefix to which mobile network prefix, p, is appended to create the mobile router prefix (HoA(p)). For most purposes, this prefix could be 64 bits.

There are two options for creating and assigning the HoA (p). First, the mobile network prefix and home address may be both provisioned ahead of time and do not change. In this case, the HoA(p) is the mobile router's normal home address, which is generated by concatenating the mobile router prefix (MRP) for the home address, with the bits of the mobile network prefix, p, as the low-order host bytes of the home address. This method may preferable, since the home address already directly maps from the mobile network prefix. However, it may not be possible to provision a static prefix to each mobile router ahead of time.

Thus, a different method may be used. If the mobile router has a normal home address, and needs to acquire a HoA(p) for the mobile router prefix being delegated to it, the home address sends a binding acknowledgment containing the new home address. The mobile router configures this as its (alternate) home address for the duration of the binding, and uses it to set up the bi-directional tunnel described in NEMO protocol. However, this leads to the issue of how to secure the signaling information, since the mobile router and home address do not have a pre-defined security association using the HoA(p). This issue is covered in the security section discussed below.

With this second method, each pool of prefixes preferably has a defined prefix length. It is possible for the home address to delegate multiple pools of prefixes of different lengths, but it would be necessary keep track of the length of each prefix, for instance in a table, so that mapping can be performed from incoming packets to the mobile network node to the HoA(p) of the mobile router. To accomplish this, it is preferable to pre-define how many high order bits of the mobile network node address are the prefix, which are to be placed in the low-order bits of the HoA(p).

3. Security

When a mobile router receives a new home address to use, and a prefix (HoA(p)), it must continue to secure its MIPv6 messaging with the home address. To accomplish this task, there are two preferred methods. Using a first method, the home agent creates a mapping from the HoA(p) to the home address. Whenever traffic is sent to a mobile router having a particular HoA(p), the security association for the home address is used. Similarly, when the mobile router begins using the HoA(p) to send data, it uses its existing security association based on the home address to secure the data packets.

In an alternative preferred method, a session key may be derived from the key used for the normal home address. The session key (SK(p)) will have a fixed duration lifetime, and is based on the HoA(p). The home agent can send the SK(p) to the mobile router in an option in the base address, along with the HoA(p) and the mobile network prefix, p, options.

It should be noted that, for the purposes of prefix ownership, the home agent preferably owns the pool of prefixes being delegated; meaning, it has administrative responsibility for advertising, and ownership rights over, the routing of, those prefixes. When this is established, the home agent delegates these rights to the mobile router for the duration of prefix ownership. The mobile router preferably always considers the prefix valid for the lifetime of the accepted binding, and no longer, just as the home address is preferably only used for the duration of said binding.

However, in the case of a provisioned prefix (and corresponding home address), both of them are logically "owned" and valid for the mobile router to use, for however long this configuration information stays static in the provider's database (i.e. the home agent configuration or database it accesses for this configuration). However, again, for the purposes of protocol interaction and address usage, the mobile router preferably considers these addresses and prefixes as usable only during the lifetime of the valid binding. This is especially the case in embodiments wherein the mobile network prefix, p, and HoA(p) may be recycled with a different mobile router when the original binding expires.

4. Operation of Home Agent

Figure 5:
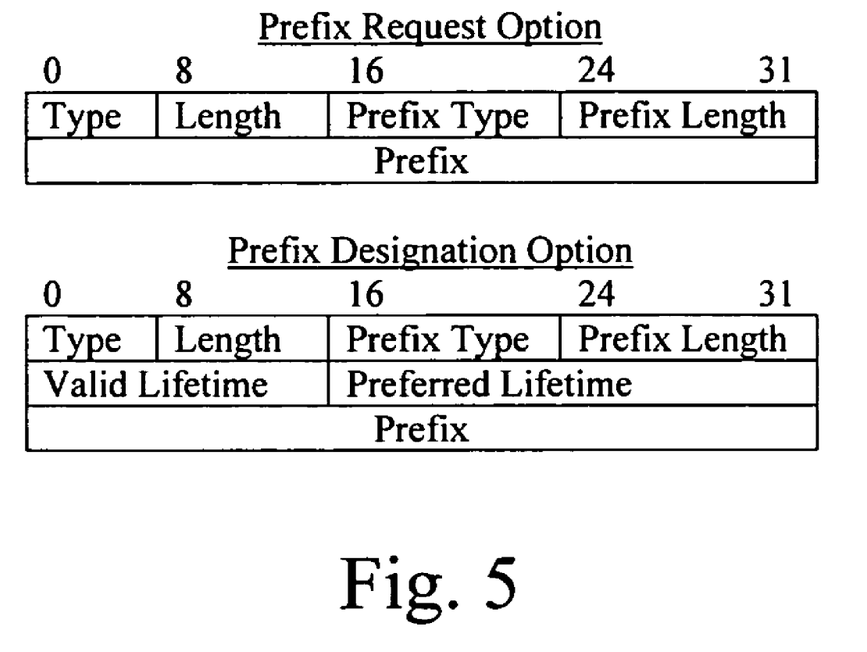
FIG. 5 is a diagram representing an example provisioning table for a prefix request option and a table for prefix delegation option according to one embodiment.

In one embodiment, as discussed above, the home agent has access to a provisioning table that lists prefixes to be delegated. Each group of addresses has the prefix length defined. FIG. 5 is a diagram representing an example provisioning table for a prefix request option, and an example provisioning table for a prefix delegation option. As further discussed above, the home agent has pre-defined security associations with each mobile router. The only difference between the two tables is that the prefix delegation option contains a valid lifetime and a preferred lifetime added for the prefix. The valid lifetime contains the time, in seconds, that the prefix remains valid. The preferred lifetime contains the time, in seconds, that the prefix may be used to start new connections.

In both tables, a type field (bits 0-7) is used to designate the type of option (e.g., a type value of 7 may designate that the option is a prefix request option, and a type value of 8 may designate that the option is a prefix delegation option). A length prefix designates the length of the option (bits 8-15). A prefix type field (bits 16-23) may designate another value for the type of option (e.g., 1 may indicate no extra value type is intended, 1 may indicate that the option is global, 2 may indicate that the option is local, and 3 may indicate that the option is private). The prefix length (bits 24-31) may indicate the length of the prefix.

Figure 6:
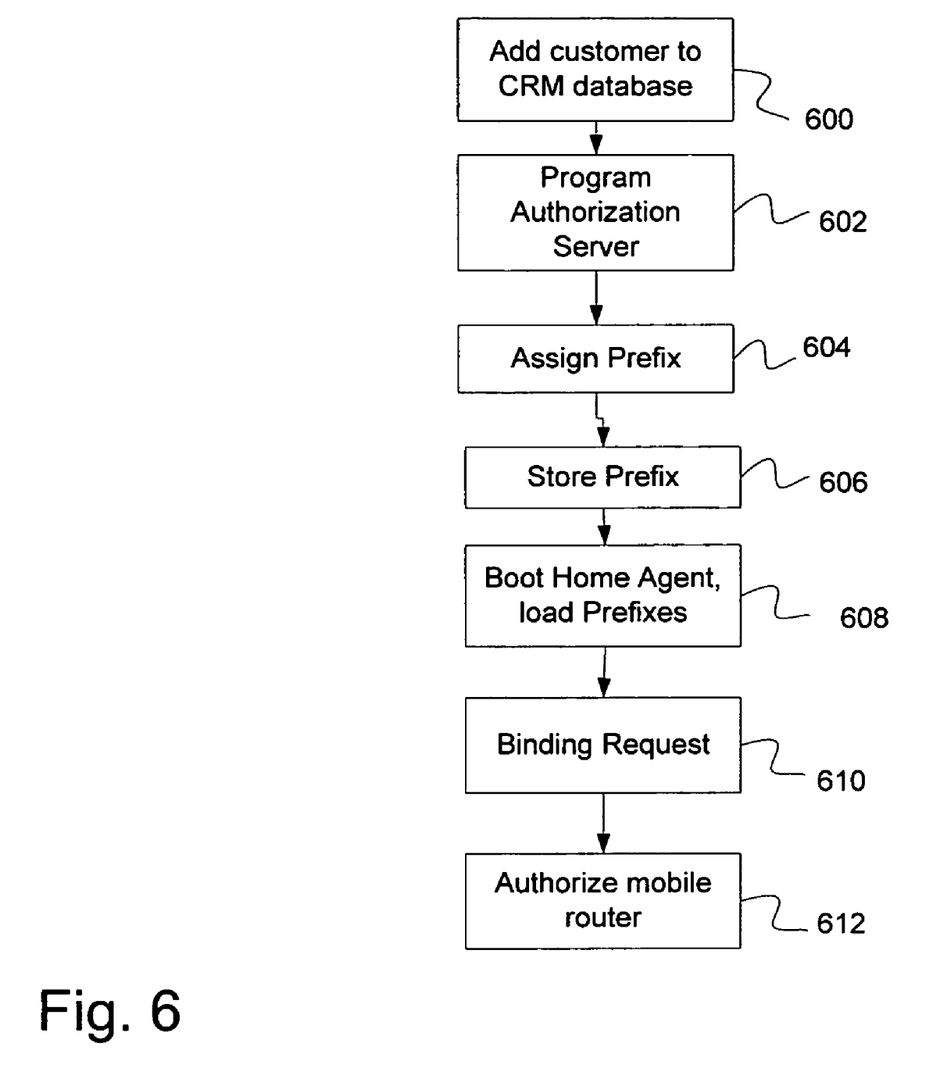
FIG. 6 is a flow diagram illustrating the steps preformed in a mobile phone embodiment.

With reference to FIG. 6, a flow diagram illustrates the steps preformed in an embodiment of the invention used by a cellular or mobile phone. In step 600, when the customer signs an account agreement, their information enters a customer relation management (CRM) database. Part of this information includes information regarding the network settings for their mobile unit. Authorization for service usage is programmed into authorization servers, step 602.

At this time, a prefix is assigned to the user, step 604. Referring back to FIG. 3, for purposes of this example, the prefix comes from a pool of 40 bits, which is 3ffe:1200:30::, wherein each prefix in the pool is known to be 48 bits long (preferably, most delegated prefixes are this length), and it is represented as 3ffe:1200:3012::. The 64-bit prefix 3ffe:1200:3000:1234:: has been assigned to be the mobile router prefix. All mobile routers at this provider will use this prefix for at least part of their home address. This means the home address prefix (HoA(p)) is calculated to be 3ffe:1200:3000:1234:0000:3ffe:1200:3012.

The mobile network prefix and home address will be stored in the database, as well as an IPsec key. In step 606, the mobile network prefix and the IPsec key are stored in the mobile router, which, in this case, is located in a mobile phone handset.

When the home agent boots up and initializes, it uses a database interface library to read configuration information from the customer database, step 610. The home agent may load a table in memory with all of the mobile router home addresses, mobile node prefixes, security key etc. In one embodiment, the database is queried for this information each time an incoming binding is received. This has the disadvantage that it slows down the MIPv6 process, but has the advantage that the home agent doesn't need to store information about all subscribers, only a fraction of whom will actually have an active binding. To mitigate the disadvantage, one embodiment may optimize by caching binding information in the home agent's memory after successful binding establishment, so that for example, fast handovers would be possible without doing database queries at each handover.

Along with existing MIPv6 and NEMO protocol info, the home agent also loads the mobile router prefix from a stored configuration, as well as the prefix length information for the pool of prefixes as shown above.

After these initial configuration steps, the mobile router at some point will send a binding update with the R bit set and the prefix request option, step 610. As referred to above in the Security section, the home agent queries the database, finds the home address, mobile network prefix, and security key, along with any authorization info for mobile router services that are needed for authorization. When the home agent has verified that the binding update is authenticated and the mobile router is authorized to use a prefix, it sends a binding acknowledgement, step 612. Since home address is the HoA (p) in this described embodiment, it simply uses home address. It also includes a prefix designation option with the mobile router prefix as described above.

Next, the home agent sets up a bidirectional tunnel with the mobile router, and sets up routing table entries and binding cache entries according to MIPv6 and NEMO protocols. Whenever packets are received by the home agent, after checking the binding cache and route table, it performs an additional check to see whether the prefix of the IPv6 destination is part of its mobile network prefix pool(s). This feature is implemented by adding a route table entry for each prefix pool, and giving the routing table entry a special flag, rt_mnp, which signifies that the code should branch to calculate the HoA(p), and encapsulate this packet to the mobile router. Another prefix length field for the mobile network prefix is added. The route table entry may have the prefix length of the pool of addresses; however the new mobile network prefix length specifies the number of bits of prefix to take from the original packet to construct HoA(p)

With reference bat to FIG. 5, in this example, a routing table entry for prefix 3ffe:1200:30:: is created with length 40, the special flag rt_mnp, and mobile network prefix length 48. The next hop address can be set to all 0s—it will be ignored anyway, as the next hop is calculated dynamically. Note that this prefix is length 40 and covers the entire prefix pool. However, the prefix length in the entry is length 48, because it refers to the length of the prefix that will be copied from the packet's destination address to create the HoA(p)—and that will include the additional byte that we assign to each mobile router's mobile network prefix.

Figure 7:
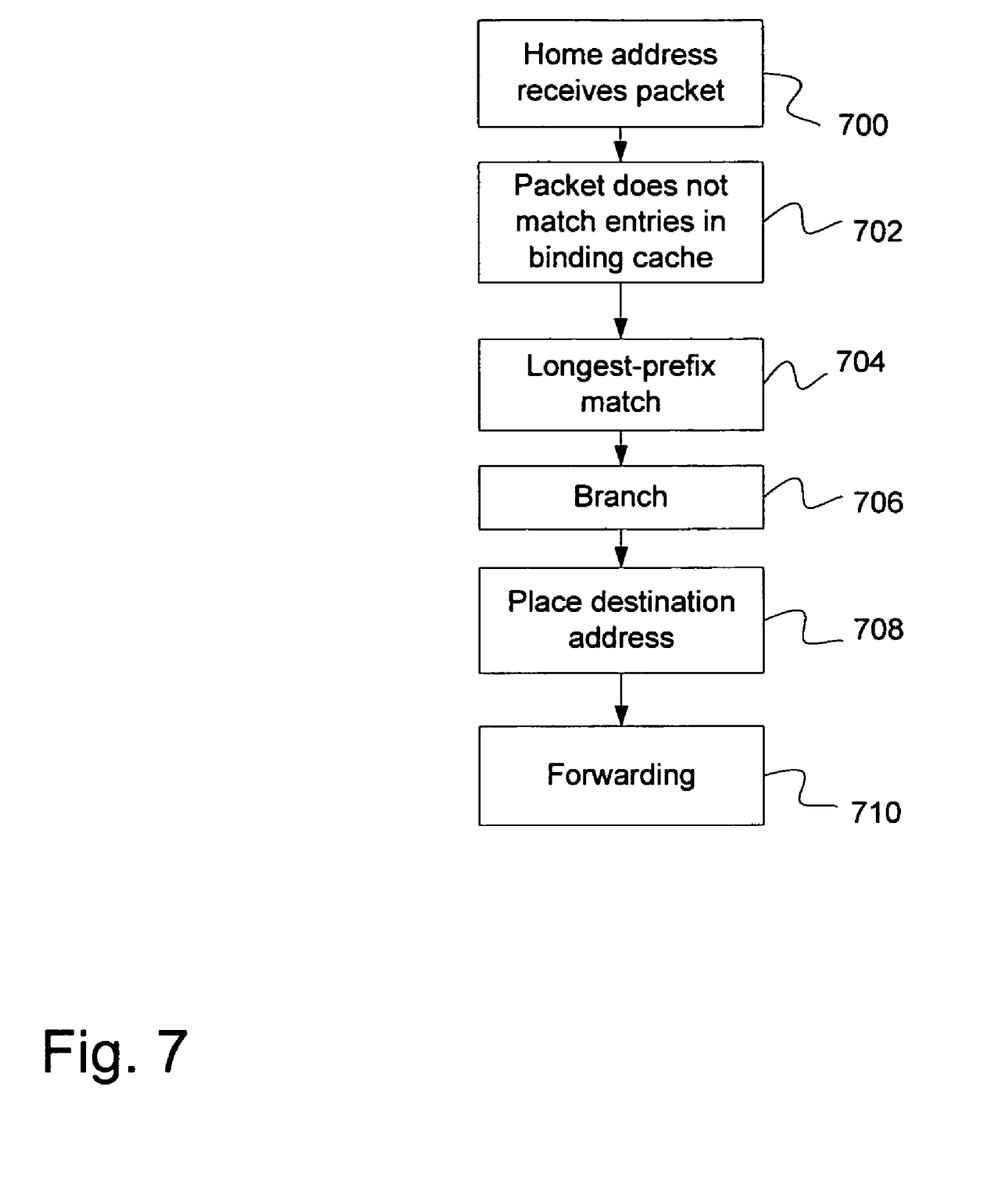
FIG. 7 is a flow diagram illustrating the steps performed when a packet destined for mobile network node in one embodiment.

With reference to FIG. 7, a diagram illustrates the steps performed when a packet destined for mobile network node 3ffe:1200:3012:c041:a:b:c:d arrives at the home address, step 700. In step 702, the packet does not match any entries in the binding cache. A longest-prefix match in the prefix table will match the first 40 bytes of the destination address with the entry created as described above, step 704.

The software code then branches to the implementation code of the invention, which constructs a next hop address by starting with the mobile router prefix, 3ffe:1200:3000:1234::, step 706. The high 48 bits (we get this number from the mobile network prefix length in the router transport table entry) of the destination address is placed into the low 48 bits of the next hop address, step 708. The intermediate bits, if any (in this example, 12), are all 0.

At this point, the HoA(p) of 3ffe:1200:3000:1234:0000:3ffe:1200:3012 has now been determined. It should be noted that, in this embodiment, this prefix is the same as the home address calculated when provisioning the account at creation time described above, since the same algorithm was used. However, this algorithm is implemented in the kernel (or possibly user space) and executes very quickly.

Next, the packet is passed back through the forwarding engine, step 710, which recognizes the tunnel entry that was set up during the binding phase (according to the NEMO spec), and puts the packet into the tunnel, to be received by the mobile router. The advantage of this approach is that there could be thousands of mobile routers, each with thousands of mobile network nodes below them. However, the home agent does not need millions of routing table entries—it only needs to query the database when a binding update is received, maintain a cache of reasonable size to facilitate fast handovers, and have one routing table entry for the pool of mobile network prefixes.

5. Operation of Mobile Router

Figure 8:
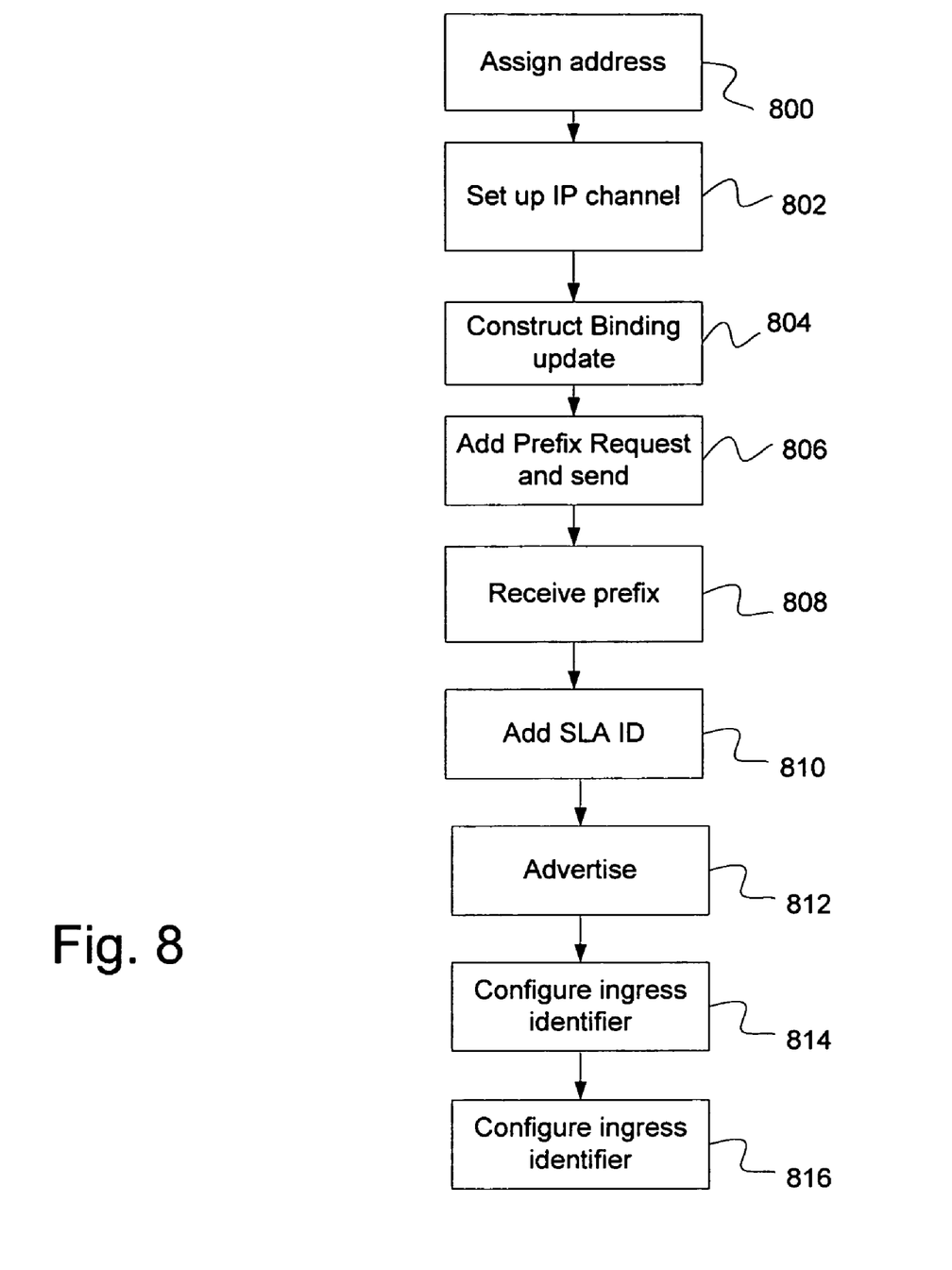
FIG. 8, a flow diagram illustrates the steps performed during mobile router operation in one embodiment.

With reference to FIG. 8, a flow diagram illustrates the steps performed during mobile router operation. Following the present mobile phone example, when the subscriber signs up for the account, the mobile phone the subscriber is provided (mobile router) is assigned in non-volatile memory the home address (e.g., 3ffe:1200:3000:1234:0000:3ffe:1200: 3012), and shared secret for IPsec communication, along with other parameters needed by MIPv6 and NEMO protocol, step 800.

When the phone is turned on, any cellular operations to set up an IPv6 channel happen first, step 802. Then, a binding update is constructed according to MIPv6 and NEMO protocol, step 804. Finally, the prefix request option is added to the binding update request, step 806. The mobile router receives back a binding update acknowledgement with a prefix delegation option containing the prefix 3ffe:1200:3012, step 808. In one embodiment, an optimization of the system could comprise sending the prefix length, even though the mobile router already has the prefix stored inside of the home address, and it could be derived.

The mobile router now appends the SLA ID, in this case c041, to the prefix, step 810, and advertises it as a prefix of length 64 in its router advertisements, step 812. The mobile network node picks up this IPv6 address and configures its address using an ingress interface identifier of 1:2:3:4 and gets the address 3ffe:1200:3012:c041:a:b:c:d, step 814.

The mobile network node starts sending traffic to an IPv6-capable correspondent node in the Internet (note that neither the mobile network node nor the correspondent node need be aware of the mobility of the mobile router). This causes the routing steps described above with respect to home agent operation. The home agent encapsulates the packet to the mobile router's egress interface. When the mobile router receives it, it de-encapsulates it according to the NEMO protocol, and sends it to the ingress interface where the mobile network node receives it.

The invention claimed is:

1. A method comprising:
   pre-configuring a home agent, having a home address, with a set of mobile router prefixes that are available to delegate;
   receiving a prefix request option from a mobile router to request a prefix, the mobile router having a home address; and
   assigning a prefix,
   wherein the assigning the prefix comprises combining a selected one of the set of mobile router prefixes with at least a part of one of said home addresses to create the assigned prefix.

2. The method of claim 1, wherein the one home address is the home address of the home agent.

3. The method of claim 1, wherein the one home address is the home address of the mobile router.

4. The method of claim 1, wherein the set of mobile router prefixes are defined manually.

5. The method of claim 1, wherein the set of mobile router prefixes are defined according to MIPv6 protocol.

6. The method of claim 1, wherein the set of mobile router prefixes are defined according to NEMO protocol.

7. The method of claim 1, further comprising:
   receiving a packet for a router;
   checking for whether the router is the mobile router; and
   if the router is the mobile router, determining the assigned prefix for the mobile router by combining the selected one of the set of mobile router prefixes with the at least part of one of the home addresses encapsulating the packet with the assigned prefix and forwarding the encapsulated packet into a tunnel for reception by the mobile router.

8. An apparatus, comprising:
   a memory configured to store a home address for the apparatus;
   a transceiver configured to send a prefix request option to a home agent to request a prefix, the home agent having a home address, the transceiver further configured to receive a prefix delegation containing an assigned prefix; and
   a processor configured to configure the apparatus to use the assigned prefix, wherein the assigned prefix comprises a selected one of a set of pre-configured apparatus prefixes combined with at least a part of one of said home addresses.

9. The apparatus of claim 8, wherein the one home address is the home address of the home agent.

10. The apparatus of claim 8, wherein the one home address is the home address of the apparatus.

11. The apparatus of claim 8, wherein the apparatus prefixes are defined manually.

12. The apparatus of claim 8, wherein apparatus prefixes are defined according to MIPv6 protocol.

13. The apparatus of claim 8, wherein apparatus prefixes are defined according to NEMO protocol.

14. An apparatus comprising:
   a home agent, having a home address and a set of mobile router prefixes that are available to delegate to mobile routers;
   a transceiver configured to receive a prefix request option from a mobile router to request a prefix, the mobile router having a home address, the transceiver further configured to send an assigned prefix; and
   a processor configured to assign the prefix by combining a selected one of the set of mobile router prefixes with at least a part of one of said home addresses to create the assigned prefix.

15. The apparatus of claim 14, wherein the one home address is the home address of the home agent.

16. The apparatus of claim 14, wherein The one home address is the home address of the mobile router.

17. The apparatus of claim 14, wherein the mobile router prefixes are defined manually.

18. The apparatus of claim 14, wherein mobile router prefixes are defined according to MIPv6 protocol.

19. The apparatus of claim 14, wherein mobile router prefixes are defined according to NEMO protocol.

20. An apparatus comprising:
   means for providing a home address and a set of mobile router prefixes that are available to delegate to mobile routers;
   means for receiving a prefix request option from a mobile router to request a prefix, the mobile router having a home address, the means for receiving further for sending an assigned prefix; and
   means for assigning the prefix by combining a selected one of the set of mobile router prefixes with at least a part of one of said home addresses to create the assigned prefix.

21. One or more non-volatile memory storing software code, when executed, perform:
   providing a home address and a set of mobile router prefixes that are available to delegate to mobile routers;
   receiving a prefix request option from a mobile router to request a prefix, the mobile router having a home address, the receiving further including sending an assigned prefix;
   creating a prefix by combining a selected one of the set of mobile router prefixes with at least a part of one of said home addresses; and
   assigning The created prefix to the mobile router.

22. The non-volatile memory of claim 21, wherein the one home address is the home address of the home agent.

23. The non-volatile memory of claim 21, wherein the one home address is the home address of the mobile router.

24. The non-volatile memory of claim 21, wherein the set of mobile router prefixes are defined manually.

25. The non-volatile memory of claim 21, wherein set of mobile router prefixes are defined according to MIPv6 protocol.

26. The non-volatile memory of claim 21, wherein set of mobile router prefixes are defined according to NEMO protocol.

27. The non-volatile memory of claim 21, said instructions further comprising:
   receiving a packet for a router;
   checking for whether the router is the mobile router; and
   if the router is the mobile router, determining the assigned prefix for the mobile router by combining the selected one of the set of mobile router prefixes with the at least part of one of the home addresses, encapsulating the packet with the assigned prefix, and forwarding the encapsulated packet into a tunnel for reception by the mobile router.

28. One or more non-volatile memory storing, when executed, perform:
   sending a prefix request option addressed to a home agent to request a prefix;
   receiving a prefix delegation containing an assigned prefix;
   configuring a mobile router for using the assigned prefix, wherein the assigned prefix comprises a selected one of a set of pre-configured mobile router prefixes combined with at least a part of one of a home address of the home agent and a home address of the mobile router.

29. The non-volatile memory of claim 28, wherein the one home address is the home address of the home agent.

30. The non-volatile memory of claim 28, wherein the one home address is the home address of the mobile router.

31. The non-volatile memory of claim 28, wherein the set of mobile router prefixes are defined manually.

32. The non-volatile memory of claim 28, wherein the set of mobile router prefixes are defined according to MIPv6 protocol.

33. The non-volatile memory of claim 28, wherein the set of mobile router prefixes are defined according to NEMO protocol.

* * * * *